US008632398B2

(12) United States Patent
Krebs et al.

(10) Patent No.: US 8,632,398 B2
(45) Date of Patent: Jan. 21, 2014

(54) WAGERING GAME MACHINE CABINET LICENSE COMPLIANCE

(75) Inventors: Larry S. Krebs, Las Vegas, NV (US); John F. LaSalvia, Las Vegas, NV (US); Jorge L. Shimabukuro, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/643,760

(22) PCT Filed: Apr. 20, 2011

(86) PCT No.: PCT/US2011/033209
§ 371 (c)(1),
(2), (4) Date: Oct. 26, 2012

(87) PCT Pub. No.: WO2011/137003
PCT Pub. Date: Nov. 3, 2011

(65) Prior Publication Data

US 2013/0053139 A1 Feb. 28, 2013

Related U.S. Application Data

(60) Provisional application No. 61/328,895, filed on Apr. 28, 2010.

(51) Int. Cl.
*G06F 17/00* (2006.01)

(52) U.S. Cl.
USPC .......... 463/29

(58) Field of Classification Search
USPC .......... 463/16–29, 40, 42
See application file for complete search history.

(56) References Cited

U.S. PATENT DOCUMENTS

| | | | | |
|---|---|---|---|---|
| 7,467,404 | B2 | 12/2008 | McAllister et al. | |
| 2001/0013099 | A1* | 8/2001 | Haruki | 713/202 |
| 2002/0112176 | A1* | 8/2002 | Murray | 713/200 |
| 2003/0134675 | A1* | 7/2003 | Oberberger | 463/29 |
| 2004/0267590 | A1* | 12/2004 | Clark et al. | 705/9 |
| 2005/0138387 | A1* | 6/2005 | Lam et al. | 713/185 |
| 2005/0165693 | A1* | 7/2005 | Moritzen | 705/59 |
| 2006/0073890 | A1 | 4/2006 | McAllister et al. | |
| 2008/0220880 | A1 | 9/2008 | Barrie et al. | |
| 2008/0234047 | A1 | 9/2008 | Nguyen | |
| 2009/0124375 | A1 | 5/2009 | Patel | |

OTHER PUBLICATIONS

"PCT Application No. PCT/US11/33209 International Search Report", Jul. 7, 2011 , 14 pages.
"PCT Application No. PCT/US11/33209 International Preliminary Report on Patentability", Nov. 21, 2012 , 4 pages.

* cited by examiner

*Primary Examiner* — Ronald Laneau
(74) *Attorney, Agent, or Firm* — DeLizio Gilliam, PLLC

(57) ABSTRACT

A cabinetmaker can create an electronic license that governs 1) components allowed to be connected to a wagering game machine and 2) functionality enabled on the wagering game machine. The electronic license (cabinet license) is bound to a wagering game machine cabinet. The cabinetmaker can load the electronic license into a secure memory area bound to the cabinet of a wagering game machine. A process (application, daemon, etc.) can perform various operations that ensure the wagering game machine complies with the cabinet license. The executable code that implements this process (license compliance code) can execute to disable components and/or functionality that do not comport with the electronic license, can execute to place the wagering game machine in a limited operation state, can execute to generate a notification of the license violation and freeze the wagering game machine, etc.

26 Claims, 13 Drawing Sheets

WAGERING GAME MACHINE CABINET LICENSE COMPLIANCE

RELATED APPLICATIONS

This application claims the priority benefit of U.S. Provisional Application Ser. No. 61/328,895 filed Apr. 28, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to wagering game machine cabinet license compliance.

SUMMARY

In some embodiments, a method comprises authenticating an electronic license secured in hardware that is affixed to a cabinet of a wagering game machine. The authentication of the electronic license at least uses a cabinet identifier. It is determined that a configuration of the wagering game machine does not comport with terms of the electronic license. Operation of the wagering game machine is regulated responsive to said determining that the configuration of the wagering game machine does not comport with the terms of the electronic license.

In some embodiments, a method comprises authenticating an electronic license secured in hardware that is affixed to a cabinet of a wagering game machine. Authentication of the electronic license at least uses a cabinet identifier. A configuration of the wagering game machine is evaluated against terms of the electronic license. If it is determined that the wagering game machine violates the electronic license based on the evaluating, then operation of the wagering game machine is regulated in response.

In some embodiments, one or more machine-readable storage media are encoded with instructions executable by a machine to obtain cabinet identification data from a plurality of wagering game machines over a network. The cabinet identification data identifies cabinets of the wagering game machines. An electronic license that applies to the plurality of wagering game machines is authenticated. The instructions are configured to use the cabinet identification data to authenticate the electronic license. Configuration of each of the plurality of wagering game machines is evaluated against terms of the electronic license. The electronic license is enforced upon the plurality of wagering game machines based on a result of the instructions evaluating the configuration of each of the plurality of wagering game machines against the terms of the electronic license.

In some embodiments, a wagering game machine comprises a cabinet, a processor coupled with the cabinet, and means for authenticating an electronic license, which is bound to the cabinet. The means for authenticating the electronic license authenticates with authentication data partially derived from an identifier associated with the cabinet. The means for authenticating the electronic license uses the processor. The wagering game machines also comprises means for determining compliance of the wagering game machine with the authenticated electronic license, and means for regulating operation of the wagering game machine to enforce terms of the electronic license.

BACKGROUND

Wagering game machines, such as slot machines, video poker machines and the like, have been a cornerstone of the gaming industry for several years. Software is installed or activated on a wagering game machine in accordance with a software license tied to the wagering game machine.

BRIEF DESCRIPTION OF THE FIGURES

Embodiments of the invention are illustrated in the Figures of the accompanying drawings in which.

DESCRIPTION OF THE EMBODIMENTS

The description that follows includes example systems, methods, techniques, instruction sequences, and computer program products that embody techniques of the present inventive subject matter. However, it is understood that the described embodiments may be practiced without these specific details. For instance, although examples refer to a backplane, embodiments can be implemented with a midplane, near field communication technology (e.g., a NFC plaque), etc. In other instances, well-known instruction instances, protocols, structures, and techniques have not been shown in detail in order not to obfuscate the description. The term "wagering game machine" is used herein when referring to an entire machine including the housing/cabinet.

An issue that can arise after wagering game machine deployment is alteration of components or functionality of the wagering game machine. The alteration may conflict with a certification granted to the wagering game machine, customer agreements, jurisdictional requirements, and compatibility of components of the wagering game machine. These conflicts can impair operation of the wagering game machine and/or deteriorate the reputation of a developer, designer, and/or manufacturer of a cabinet ("cabinetmaker"). These conflicts and operation impairment deteriorate reputation of the cabinetmaker of the wagering game machine since a graphic, name, or logo of the cabinetmaker is often prominently displayed on the cabinet of the wagering game machine. A cabinetmaker can create an electronic license that governs 1) components allowed to be connected to a wagering game machine and 2) functionality enabled on the wagering game machine. The electronic license ("cabinet license") is bound to a wagering game machine cabinet. The cabinetmaker can load the electronic license into a secure memory area bound to the cabinet of a wagering game machine. A process (application, daemon, etc.) can perform various operations that ensure the wagering game machine complies with the cabinet license. The executable code that implements this process ("license compliance code") can execute to disable components and/or functionality that do not comport with the electronic license, can execute to place the wagering game machine in a limited operation state, can execute to generate a notification of the license violation and freeze the wagering game machine, etc.

Figure 1:
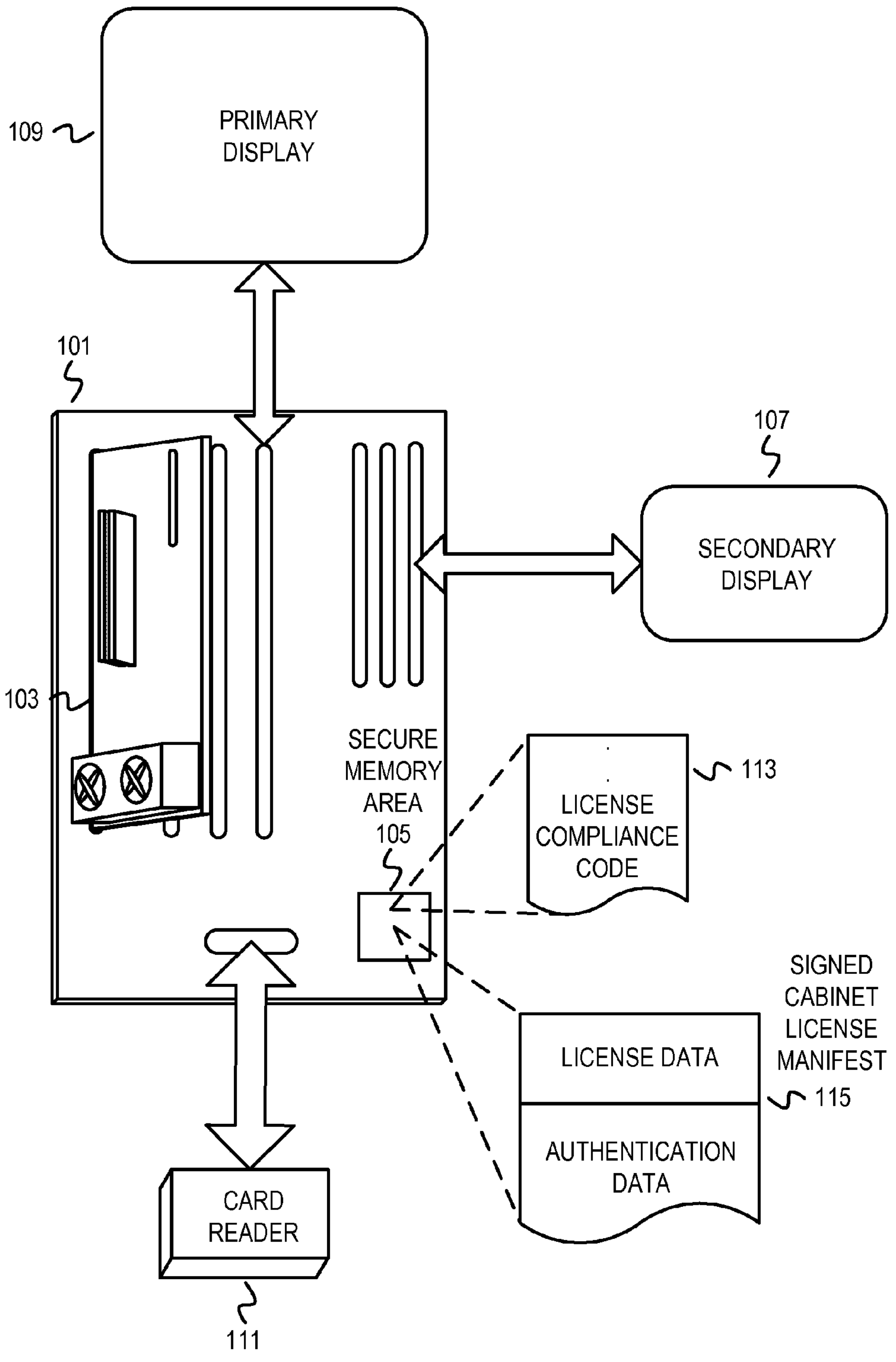
FIG. 1 depicts a diagram of example components and code for enforcing a wagering game machine cabinet license.

FIG. 1 depicts a diagram of example components and code for enforcing a wagering game machine cabinet license. An example wagering game machine comprises a primary display 109, a secondary display 107, a backplane 101, and a card reader 111. Although not depicted, the backplane 101 is physically affixed to a cabinet of the wagering game machine. The card reader 111 and a secondary display 107 are both plugged into the backplane 101. In addition, a board 103, which includes a processor and cooling components, is plugged into the backplane 101. The backplane 101 comprises a secure memory area 105. The secure memory area 105 is depicted as hardware that is integral to the backplane 101 (e.g., soldered into the backplane 101, built into the backplane 101, etc.). Embodiments can implement the secure memory area 105 as copy protected EEPROM, encrypted memory, a cryptographic processor, etc.

The secure memory area 105 hosts a license compliance code 113 and a signed cabinet license manifest 115. A compliance code 113 comprises code that enforces cabinet license compliance. For instance, compliance code 113 can regulate operation of wagering game machine in accordance with a cabinet license. Example techniques for regulating operation of the wagering game machine include disabling operation of the wagering game machine, allowing limited operation of the wagering game machine, allowing operation of a wagering game machine for a limited duration sufficient to allow the wagering game machine to be brought into compliance with the cabinet license, etc. In FIG. 1, the signed cabinet license manifest 115 comprises license data and authentication data. The authentication data allows the wagering game machine to authenticate the license hosted in the secure memory area 105. The license data comprises cabinet license terms. The cabinet license terms can indicate one or more configurations permissible for a wagering game machine. The cabinet license terms can indicate hardware components that can be utilized with the wagering game machine, functionality/features that can be activated on the wagering game machine, etc.

For instance, a cabinet license may restrict a wagering game machine that comprises a cabinet subject to the cabinet license to a particular display configuration. The particular display configuration may be a single display configuration. In this case, the license compliance code 113 would regulate operation of the wagering game machine after detecting the secondary display 107. The particular display configuration may allow a secondary display of a particular type that consumes a certain amount of energy. In this case, the license compliance code 113 would regulate operation of the wagering game machine dependent upon data about the secondary display 107.

Figure 2:
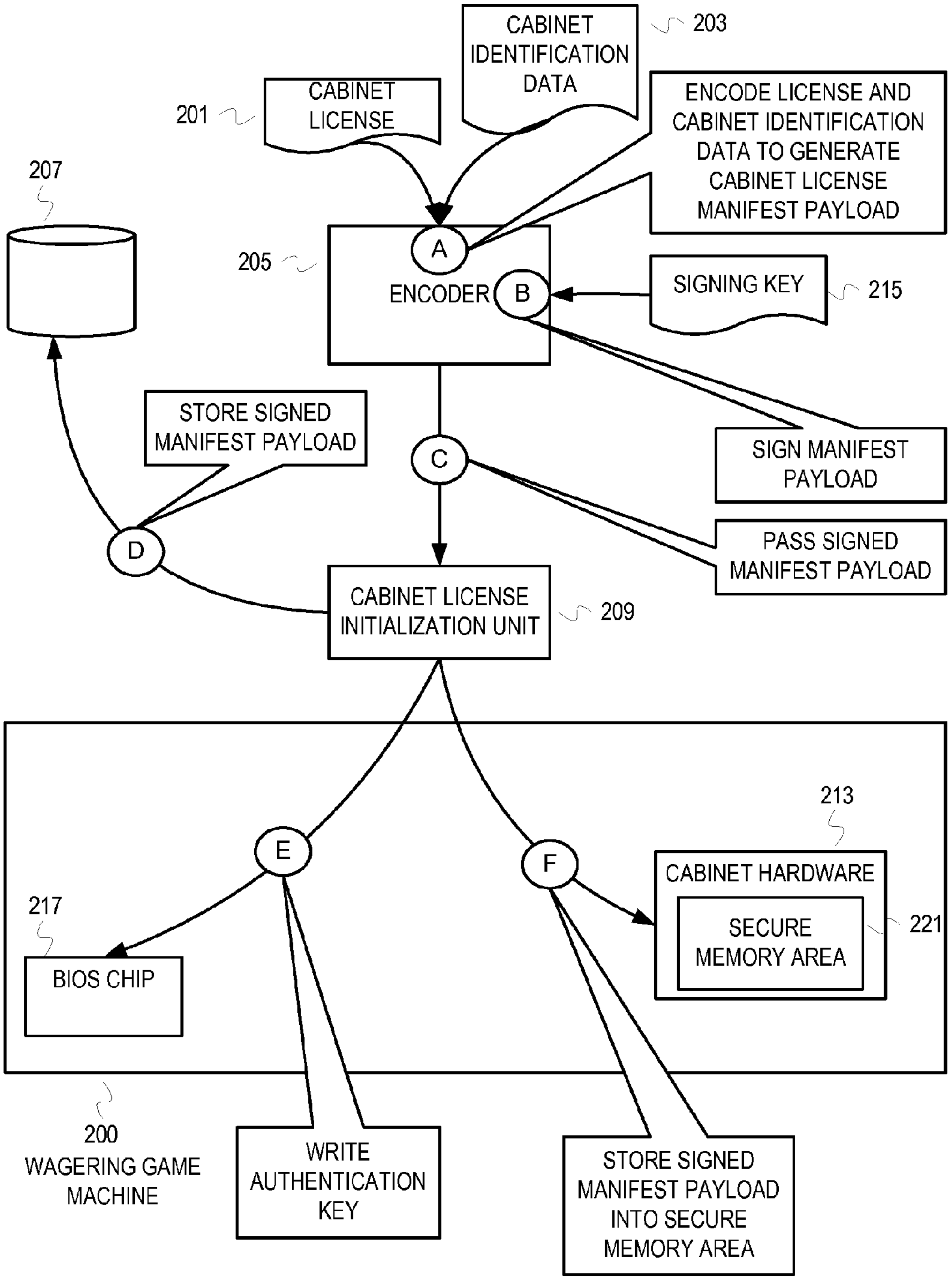
FIG. 2 depicts a diagram of an example initialization of a wagering game machine for authentication of a cabinet license.

Prior to enforcing cabinet license on the wagering game machine in the field, a cabinetmaker will take measures to ensure authenticity of a cabinet license. Various encoding and authentication mechanisms can be employed. FIG. 2 depicts a diagram of an example initialization of a wagering game machine for authentication of a cabinet license. At A, an encoder 205 encodes a cabinet license 201 and cabinet identification data 203 to generate a cabinet license manifest payload. The cabinet license 201 can set out a variety of terms and conditions to govern configuration of a wagering game machine that comprises a cabinet subject to the cabinet license 201. The cabinet identification data 203 can indicate any one or more of a cabinet model name, a cabinet model number, a cabinet serial number, a cabinet type, a cabinet manufacturer, a cabinet designer, a digital registration number (e.g., silicon serial number laser inscribed onto an integrated circuit that is soldered on cabinet hardware), manufacturer record information (e.g., manufacturer serial number), etc. The encoder 205 can perform any one of various hashing techniques.

At B, the encoder 205 signs the cabinet license manifest payload with a signing key 215.

At C, the encoder 205 passes the signed manifest payload to a cabinet license initialization unit 209.

At D, the cabinet license initialization unit 209 stores the signed manifest payload into a database 207. A cabinetmaker can store signed manifest payloads in association with cabinet identification data for tracking purposes. In some embodiments, the cabinet identification data ties together manufacturer record information (e.g., manufacturer serial number) and a cabinet identifier (e.g., cabinet model number). Embodiments can tie the manufacturer record information and the cabinet identifier together in accordance with various techniques (e.g., hashing). For instance, a cabinetmaker may access the database to update a cabinet license, to modify a cabinet license, to perform audits, etc.

At E, the cabinet license initialization unit 209 writes an authentication key into a BIOS chip 217 of a wagering game machine 200. The BIOS chip 217 is typically part of a processing unit or logic box that is removable from the wagering game machine 200. The authentication key corresponds to the signing key 215.

At F, the cabinet license initialization unit 209 stores the signed manifest payload into a secure memory area 221, which is a component of cabinet hardware 213 (e.g., backplane, midplane, circuitry built into the cabinet, etc.). Although not depicted, the cabinet identification data 203 and the cabinet license 201 can also be stored in a secure memory area 221, although it is not necessary. The cabinet license 201 indicates identification data 203 can be stored in various devices including persistent memory, a storage device, etc.

Figure 3:
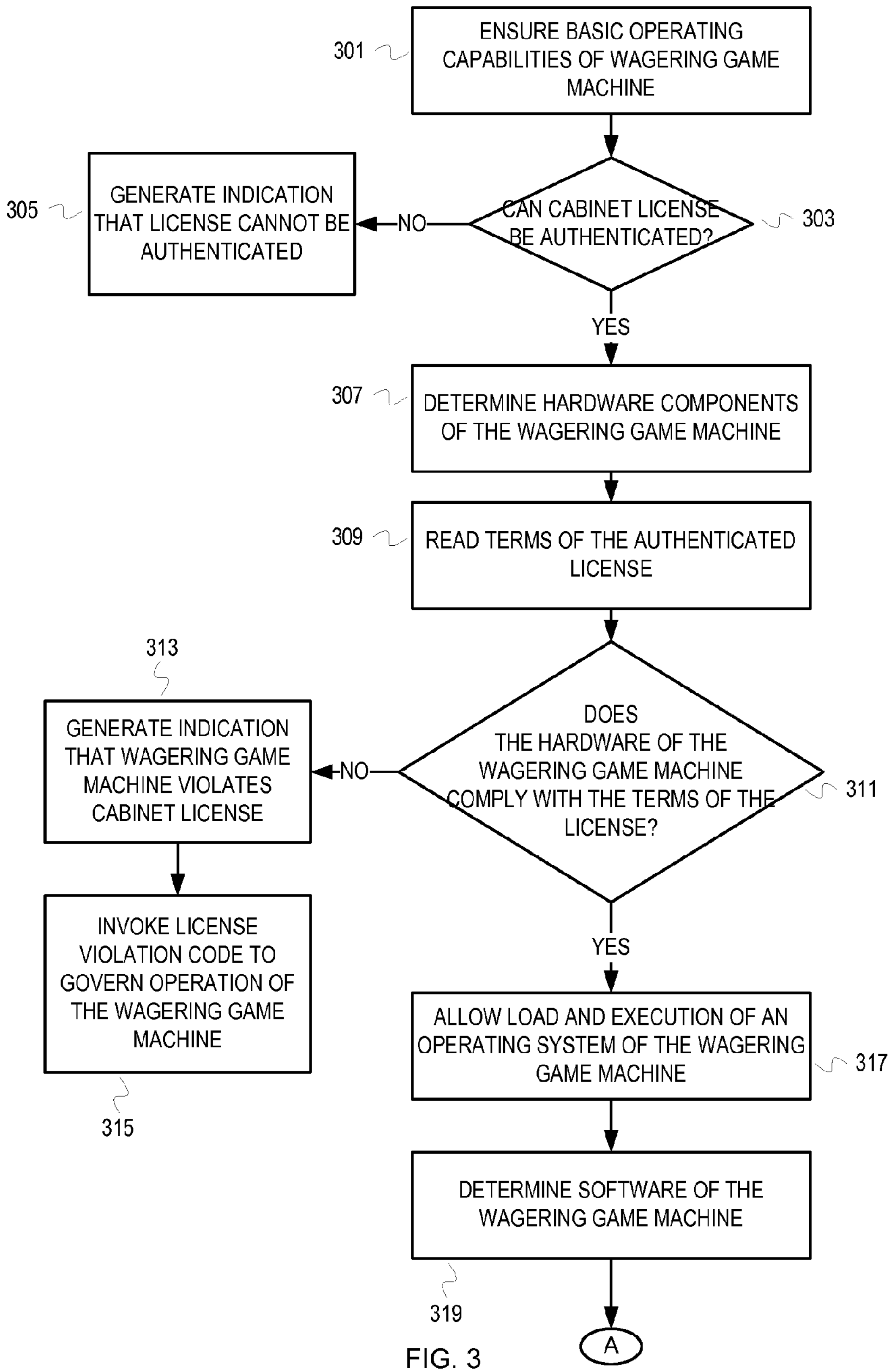
FIGS. 3-4 depict a flowchart of example operations for governing a wagering game machine to enforce with cabinet license compliance.
Figure 4:
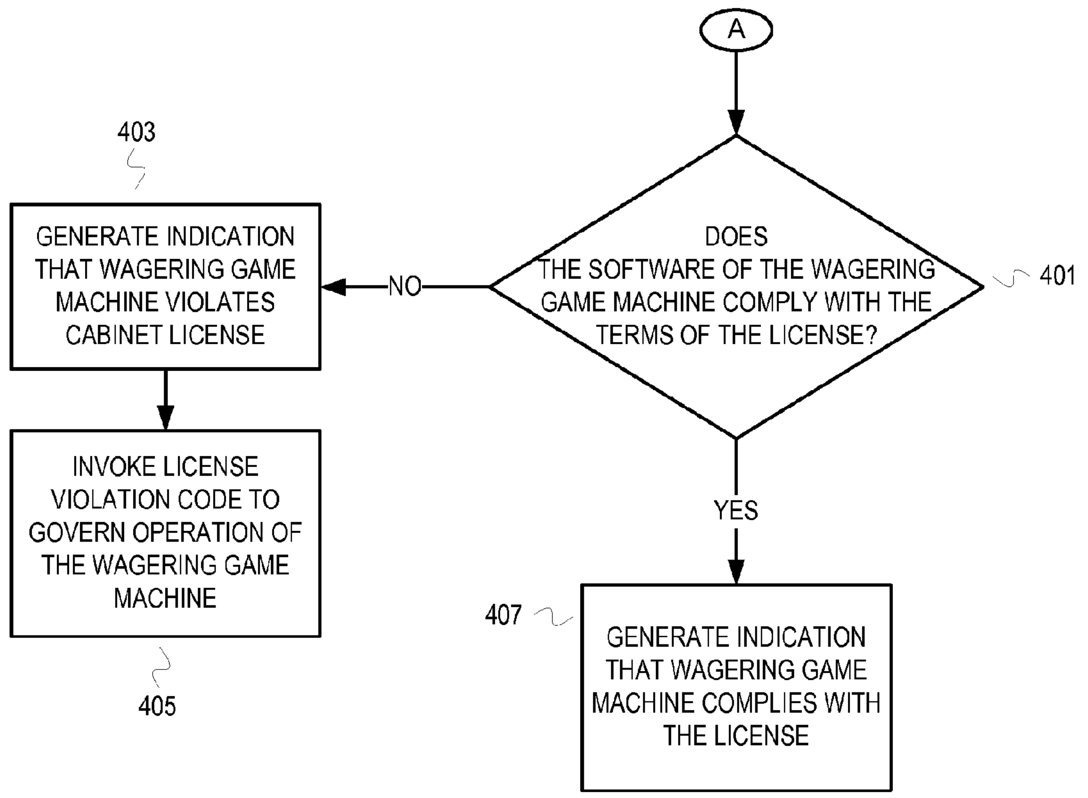

Securing the signed cabinet license manifest payload, which was derived from at least a cabinet license and cabinet identification data, in secure memory bound to a wagering game machine cabinet provides greater control for the cabinetmaker over use of their wagering game machine cabinet. As stated previously, cabinet license compliance can be enforced for regulating operation of wagering game machine that comprises the cabinet. FIGS. 3-4 depict a flowchart of example operations for governing a wagering game machine to enforce with cabinet license compliance. FIG. 3 begins at block 301 where basic operating capabilities of a wagering game machine are ensured. For instance, a BIOS of the wagering game machine is executed upon power up of the wagering game machine. Embodiments can implement the BIOS within a processing unit or logic box that is removable from the wagering game machine. Although examples refer to a BIOS, embodiments are not so limited. Embodiments can be implemented with various hardware interfaces. For example, embodiments can use the Extensible Firmware Interface instead of or in addition to a BIOS.

At block 303, it is determined if a cabinet license of the wagering game machine can be authenticated. Embodiments can utilize a variety of authentication techniques. For instance, embodiments can use authentication techniques that employ a cryptographic hash function (e.g., SHA-256, MD5, etc.) to generate a message digest. Embodiments can then apply a digital cryptographic signature to the message digest. If the cabinet license cannot be authenticated then control flows to block 305. If the cabinet license can be authenticated, then control flows to block 307.

At block 305, an indication that a cabinet license cannot be authenticated is generated. For example, an entry is added to a log that indicates failure of cabinet license authentication. As another example, a value can be set that leads to a notification being sent to an administrator to inform the administrator of the failed authentication.

At block 307, hardware components of a wagering game machine are determined. For instance, a process that enforces the license accesses data that indicates detected hardware (e.g., a card reader, a display, a motherboard, etc.).

At block 309, terms of the authenticated cabinet license are read. For example, the cabinet license terms can identify hardware components that can be associated with the cabinet, which is subject to the cabinet license. The granularity of identity can vary. For instance, the cabinet license terms can indicate that a second display is allowed or indicate that only particular models of particular manufacturers can be used as secondary displays in conjunction with the cabinet. The cabinet license terms can also specify allowable configurations that can be associated with a cabinet. For example, the cabinet license terms can indicate that processor A with a maximum operating frequency of 1 GHz can be used if a particular type of memory and a particular display are also associated with the cabinet. The cabinet license terms can allow certain restricted hardware to be associated with a cabinet if the hardware is disabled. Furthermore, the terms of a cabinet license can require components that satisfy certification requirements. For example, only components with a particular energy rating or energy conservation certification can be utilized in the wagering game machine.

At block 311, it is determined if the hardware of the wagering game machine complies with the terms of the authenticated cabinet license. For example, installed hardware components can be compared against a list of allowed and/or prohibited hardware components in the cabinet license. As another example, a hash of the installed/active hardware components can be compared against a hash of permitted or prohibited hardware components indicated in the cabinet license. Code may also query components and/or a process for certification information that travels with the components and/or software corresponding to the process. If the wagering game machine does not comply with the hardware terms, then control flows to block 313. If the wagering game machine complies with the hardware terms of the authenticated cabinet license, then control flows to block 317.

At block 313, an indication that the wagering game machine violates the authenticated cabinet license is generated. Examples of indications being generation include generating a message to be sent to an administrator, updating a log to reflect the license compliance failure. In addition to the failure, embodiments can also identify the cabinet license term violated and/or the hardware component or hardware configuration that violated the cabinet license terms.

At block 315, license violation code is invoked to govern operation of the wagering game machine. For example, the license violation code can disable a hardware component that violates terms of an authenticated cabinet license. The license violation code can shut down the wagering game machine. The license violation code can freeze the wagering game machine, take control of a primary display, and cause a cabinet license compliance failure notice to be displayed. As another example, the license violation code can initiate countdown of a time period to allow rectification of the license violation. At the expiration of the time period, the wagering game machine that comprises the cabinet hardware is shut down. The license violation code can also store a flag in secure persistent memory that does not allow full operation of the wagering game machine into the wagering game machine is brought into compliance.

If the wagering game machine complied with the hardware terms of the cabinet license, then the operating system of the wagering game machine is allowed to load and execute at block 317.

At block 319, software of the wagering game machine are determined. For example, the process that enforces the cabinet license can communicate with the operating system to determine software installed/activated on the wagering game machine. As another example, the license enforcement process can read a registry to determine software of the wagering game machine. Control flows from block 319 to block 410 of FIG. 4.

FIG. 4 depicts operations that continue from FIG. 3. At block 401, it is determined if the software of the wagering game machine complies with the terms of the authenticated cabinet license. Example software terms of the authenticated cabinet license can include a particular version of an operating system, games allowed to be installed, accounting software permitted, accounting software prohibited, social network software allowed, whether portals are permitted, etc. If the wagering game machine violates the software terms of the authenticated cabinet license, then control flows to block 403. If the wagering game machine complies with the software terms, then control flows to block 407.

At block 403, an indication that the wagering game machine violates the software terms of the cabinet license is generated. As previously stated, examples of generating the indication include generating a log entry; generating a notification to be sent via electronic mail, paging system, instant message, etc.; generating a notification to be displayed on the wagering game machine; setting a flag in secure memory bound to the wagering game machine cabinet; etc.

At block 405, license violation code is invoked to govern operation of the wagering game machine. For example, the license violation code may allow the operating system to be run, but prevent any wagering game software from being launched. As another example, the license violation code can prevent violating software from being launched. The license violation code can also uninstall violating software. License violation code can also consult a history or log of license violations to determine if the wagering game machine repeatedly violates terms of the cabinet license. The license violation code can disable the wagering game machine or notify a cabinetmaker of the wagering game machine if the offenses exceed a given threshold. Repeat violations of a cabinet license may reflect a malfunction or unexpected incompatibility between software and/or hardware of the wagering game machine.

If the wagering game machine complied with the software terms, then an indication that the wagering game machine complies with the license is generated at block 407. This indication can be used to allow full operation of the wagering game machine. Embodiments can use the indication in a log or history, or forgo generating the indication of compliance (e.g., normal operation can be an implicit indication that the wagering game machine is compliant). The generated indication can also be a true value, perhaps transient, that represents the evaluation of the license terms against the configuration of the wagering game machine.

Although examples refer to allowable hardware or software, embodiments are not so limited. Embodiments can implement a cabinet license with terms that indicate prohibited functionality (hardware or software), permitted functionality, both permitted and prohibited functionality, restricted functionality, etc.

In addition, examples refer to allowing an operating system to load and execute. Embodiments can, however, allow an operating system to load and execute in a limited mode, perform license compliance and enforcement operation, and then allow the operating system to run in a normal mode. Embodiments can also determine license compliance and enforcement after an operating system launches. Embodiments can task the operating system with authenticating the cabinet license.

Figure 5:
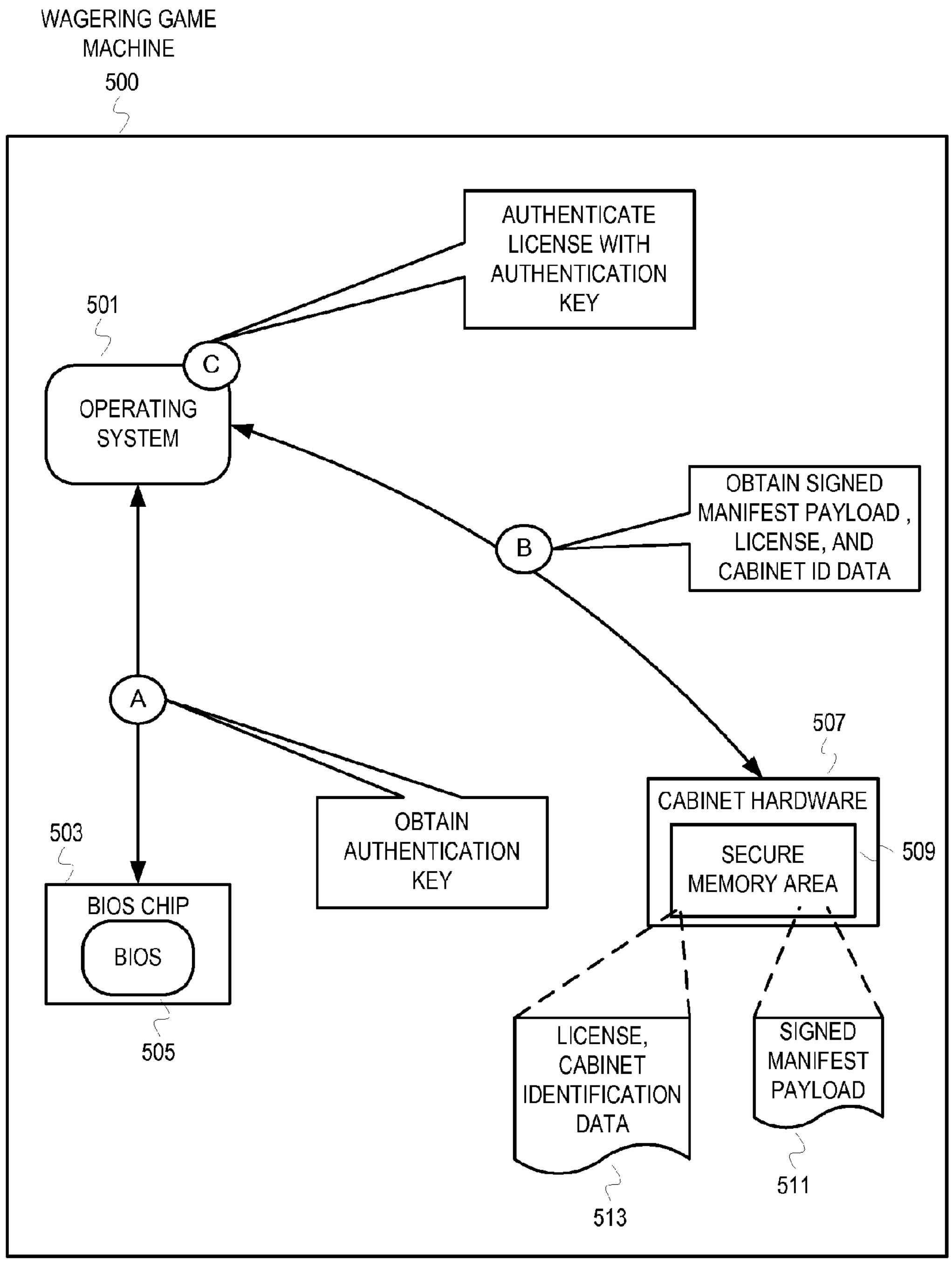
FIG. 5 depicts a diagram of an example cabinet compliance and enforcement after an operating system launches.

FIG. 5 depicts a diagram of an example cabinet compliance and enforcement after an operating system launches. A wagering game machine 500 comprises cabinet hardware 507 (e.g., backplane, midplane, etc.) and a BIOS chip 503. The cabinet hardware 507 comprises a secure memory area 509. The BIOS chip 503 hosts an instance of a BIOS 505. An operating system 501 has been loaded and executed on the wagering game machine 500.

At A, the operating system 501 obtains an authentication key from the BIOS 505. A manufacturer of the wagering game machine 500 can store a public authentication key on the BIOS chip 503. The operating system 501 and the BIOS 505 can exchange messages for the operating system 501 to obtain the authentication key. As another example, the BIOS 505 can pass the authentication key to the operating system 501 after the operating system 501 launches.

At B, the operating system 501 obtains a signed manifest payload, cabinet license, and cabinet identification data. In FIG. 5, the secure memory area 509 hosts the cabinet license 513, the cabinet identification data 513, and the signed manifest payload 511. In one example, the operating system 501 exchanges messages with a processing on the cabinet hardware 507. In another example, the operating system 501 accesses a predefined location in the secure memory area 509. Furthermore, the cabinet identification data 513 can comprise manufacturer record information (e.g., a manufacturer serial number) and a cabinet identifier (e.g., cabinet type, cabinet model number, etc.).

At C, the operating system authenticates the cabinet license with the authentication key obtained from the BIOS 505. Enforcement operations can then be performed by the operating system 501.

As illustrated above, authentication, compliance and enforcement operations can be performed at different times and by different entities. For example, the compliance and enforcement operations can be performed by the operating system 501, by an application running in the operating system 501, by a process running on the cabinet hardware 507, etc. Operations can also be divided along different boundaries. For instance, authentication can be performed by the operating system or an application in the operating system, and compliance and enforcement operations performed by a process on the cabinet hardware 507, or even another entity (e.g., an ASIC on a card plugged into the cabinet hardware. Implementations will vary with the capabilities of the cabinet hardware (e.g., a cryptographic processor versus EEPROM). In addition, the various data for authentication can be stored in different places.

Figure 6:
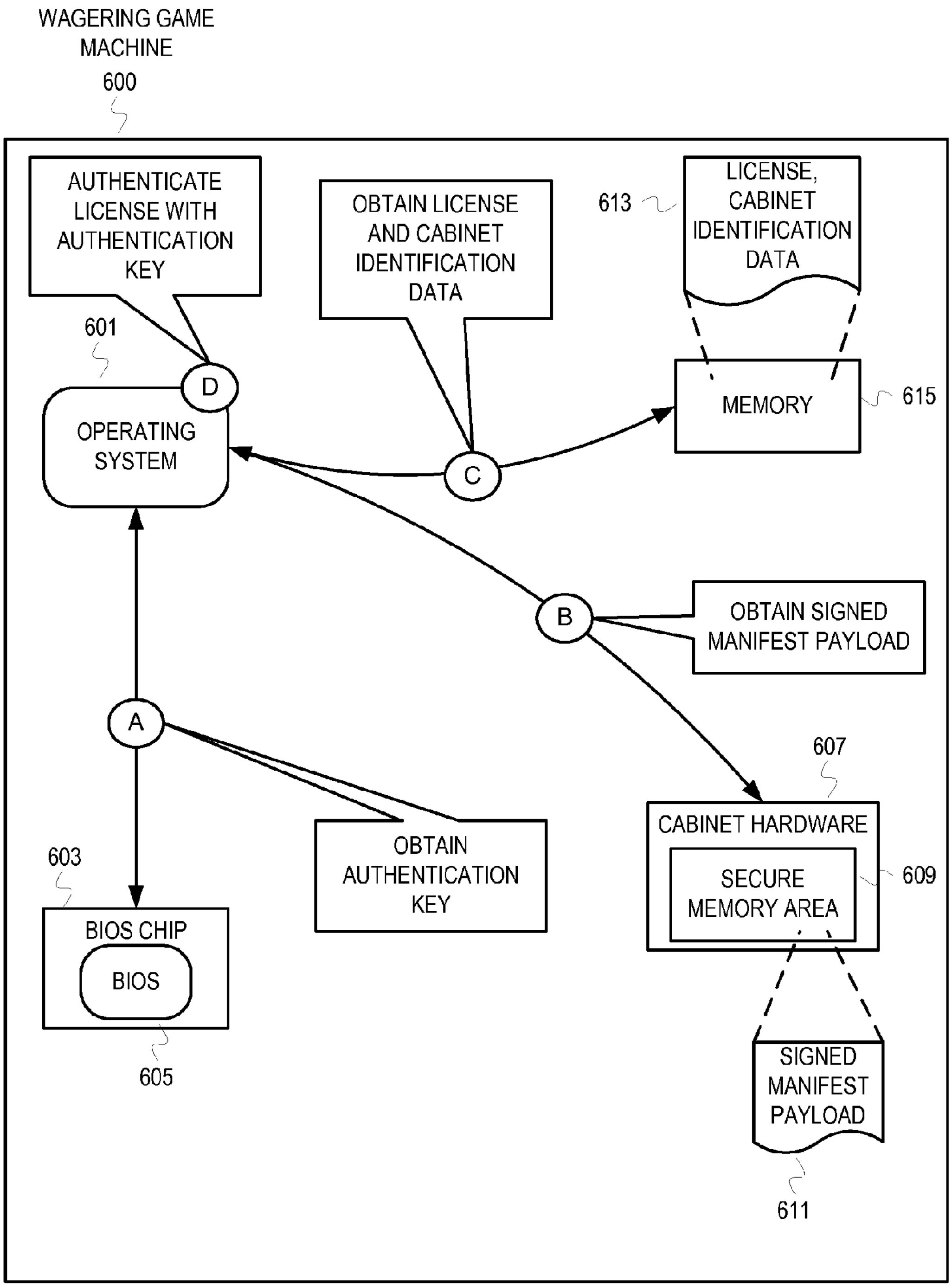
FIG. 6 depicts a diagram of example operations performed to access different aspects of the cabinet license manifest in different components.

FIG. 6 depicts a diagram of example operations performed to access different aspects of the cabinet license manifest in different components. A wagering game machine 600 comprises a BIOS chip 603, cabinet hardware 607, and memory 615 (e.g., hard disk, RAM, etc.). The cabinet hardware 607 comprises a secure memory area 609, which hosts a signed manifest payload 611. The memory 615 hosts data 613 that comprises a cabinet license and cabinet identification data. An operating system 601 is running on the wagering game machine 600.

At A, the operating system 601 obtains an authentication key from the BIOS 605.

At B, the operating system obtains a signed manifest payload from the cabinet hardware.

At C, the operating system 601 obtains a cabinet license and cabinet identification data from the memory 615.

At D, the operating system 601 authenticates the signed manifest payload 611 with the authentication key, cabinet license, and the cabinet identification data.

In addition to varying operational implementations and hardware implementations, embodiments also accommodate dynamic cabinet license compliance and enforcement. Compliance and enforcement of a cabinet license can react to changes while a wagering game machine is active. For instance, a runtime change in hardware configuration of a wagering game machine can trigger compliance and enforcement operations.

Figure 7:
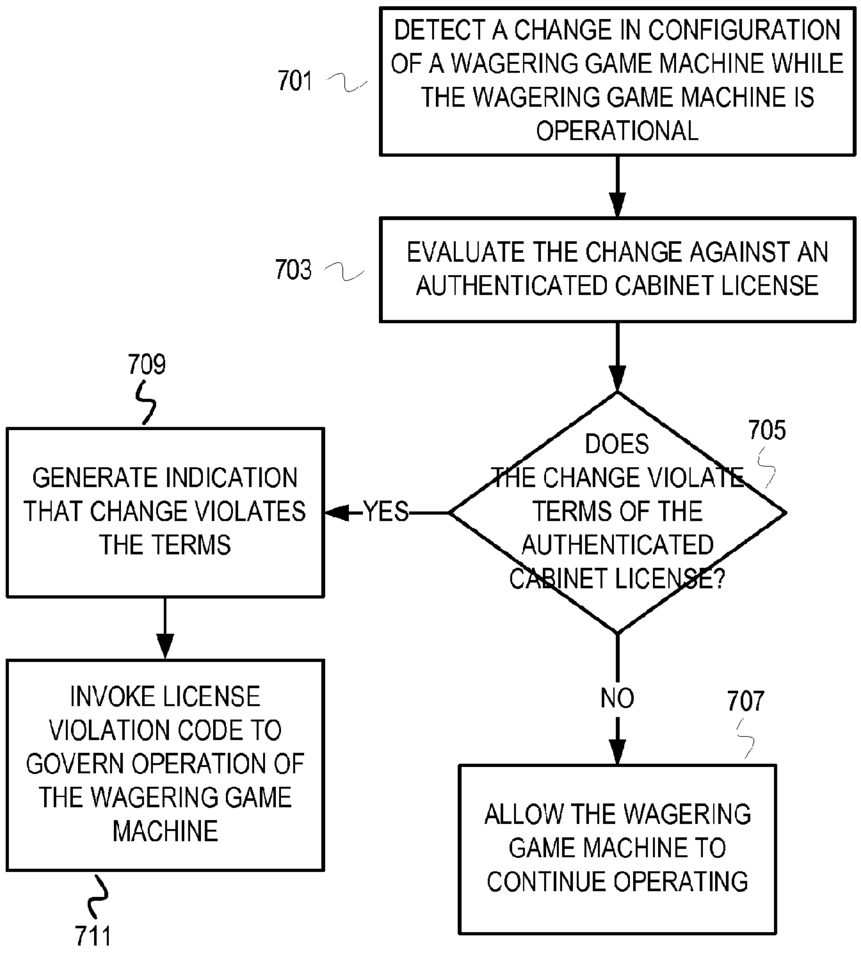
FIG. 7 depicts a flowchart of example operations for ensuring license compliance of a change to an active wagering game machine.

FIG. 7 depicts a flowchart of example operations for ensuring license compliance of a change to an active wagering game machine. At block 701, a change in configuration of a wagering game machine is detected while the wagering game machine is operational. Examples of configuration changes include attempted installation of an application, addition of a display, change of a ticket in ticket out apparatus, change in operating frequency of a processor, change in power supply, etc.

At block 703, the change is evaluated against an authenticated cabinet license. For instance, a license enforcement process or daemon determines if an added hardware or a application requested to be installed is permitted according to the authenticated cabinet license. The authenticated cabinet license may be resident on a storage device, in system memory, etc. The enforcement process may have to interact with cabinet hardware to obtain the authenticated cabinet license. Embodiments can require authentication operations to be performed again (assuming authentication operations were already performed).

At block 705, it is determined if the change to the wagering game machine violates terms of the authenticated cabinet license. If the change violates the terms, then control flows to block 709. If the change does not violate the terms, then control flows to block 707.

At block 707, the wagering game machine is allowed to continue operating with the change. Embodiments may perform additional operations, such as recording the change to a cabinet license compliance log.

At block 709, an indication is generated that the change to the wagering game machine violates the terms of the authenticated cabinet license. The indication can lead to an alarm being triggered, a notification being sent, a history/log being updated, etc.

At block 711, license violation code is invoked to govern operation of the wagering game machine. The license violation code can perform similar operations as if a violation was discovered during boot up of a wagering game machine. The license violation code can also perform other operations for violations detected after a wagering game machine becomes operational. For example, the license violation code can undo the change, disable a hardware component that corresponds to the change, uninstall software that corresponds to the change, etc.

Embodiments are not limited to a reacting to changes. A cabinet license can anticipate changes or have different conditional built in. Terms of a cabinet license can be conditional. For example, a manufacturer may create a single cabinet license for different types of wagering game machine cabinets with relevant portions enforced. If a cabinet of type A is detected, then the portion of the license that applies to the type A cabinet is enforced. Conditionals can be based on hardware configurations, software configurations, geographic location, owner of the wagering game machine, etc. For example, particular terms may only apply for a wagering game machine owned by a specified casino in a particular jurisdiction. As another example, different software terms may apply dependent upon the detected hardware configuration. Embodiments can also contemplate changes to a cabinet license after deployment.

Figure 8:
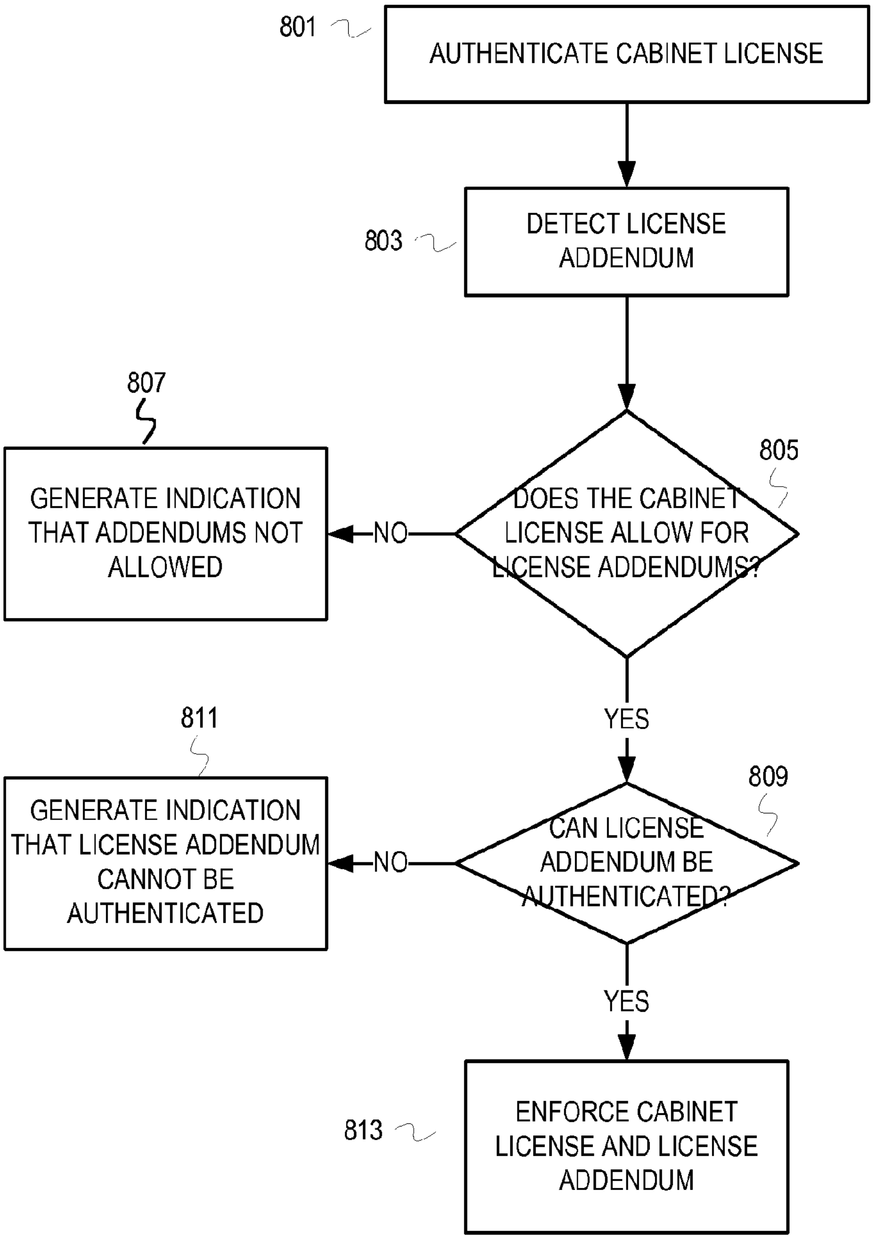
FIG. 8 depicts a flowchart of example operations for enforcing cabinet license addendums.

FIG. 8 depicts a flowchart of example operations for enforcing cabinet license addendums. At block 801, a cabinet license is authenticated.

At block 803 an addendum is detected. For example, an area of secure memory can be preallocated for cabinet license addendums, or specific locations in a hard disk can be preallocated for license addendums. If data is detected at these predefined locations, then an addendum is detected. As another example, existence of a second signed payload in the secure memory can be evidence of a license addendum. Embodiments may also allow for the cabinet license to be modified itself in the field by an authorized agent. Embodiments can also allow for license addendums added remotely by the license owner with a secure protocol for accessing the cabinet hardware.

At block 805, it is determined if the cabinet license allows for addendums. For instance, the cabinet license can include terms that indicate license addendums are permissible. The cabinet license can have references to memory locations preallocated for license addendums. Those preallocated memory locations can be set to a null value or some other value initially to represent the possibility of an addendum. If the cabinet license does not allow for addendums, then control flows to block 807. If the cabinet license allows for addendums, then control flows to block 809.

At block 807, an indication is generated that addendums are not allowed.

At block 809, it is determined if the license addendum can be authenticated. The license addendums and corresponding authentication data can be delivered at proximate times over different channels. Although a license addendum may not exist initially, a manufacturer can create authentication data and preload the cabinet hardware with the authentication data. For example, digitally signed hash of a preallocated memory address and addendum identifier can be loaded into cabinet hardware. Later, the license addendum, when created, is assigned the identifier and the preallocated memory address. If the license addendum can be authenticated, then control flows to block 813. If the license addendum cannot be authenticated, then control flows to block 811.

At block 811, an indication is generated that the license addendum cannot be authenticated.

At block 813, the cabinet license and the license addendum are enforced.

Although the above examples have presumed cabinet license compliance and enforcement responsibility lying upon the wagering game machine, embodiments are not so limited. Embodiments can implement some or all of the license compliance and enforcement operations on a remote entity, such as a server. Trusted connections can be established between a server and wagering game machine to exchange of message for license compliance and enforcement. Moreover, authentication and/or terms can be tied into the wagering game server. For instance, terms of a cabinet license may be contingent upon a particular server, management system, and/or accounting system hosted by one or more servers. Furthermore, terms of a cabinet license may apply to a group of wagering game machines. For instance, terms of cabinet licenses of several machines may be tied into the several machines being within a same network.

Figure 9:
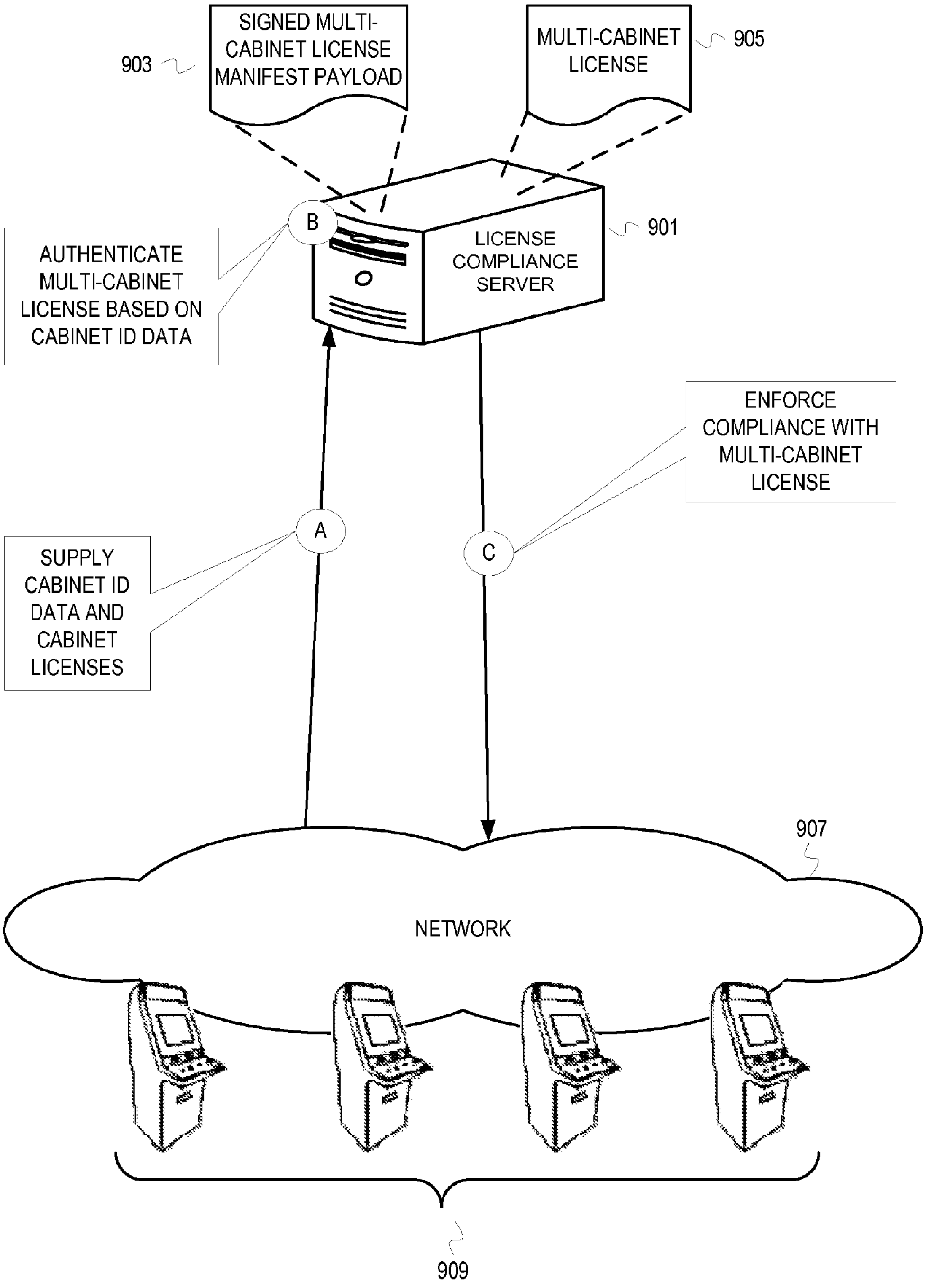
FIG. 9 depicts a conceptual diagram of an example license compliance server enforcing a multi-cabinet cabinet license.

FIG. 9 depicts a conceptual diagram of an example license compliance server enforcing a multi-cabinet cabinet license. A license compliance server 901 is communicatively coupled with wagering game machines 909 via a network 907. The license compliance server 901 hosts a signed multi-cabinet license manifest payload 903 and a multi-cabinet license 905.

At stage A, each of the wagering game machine 909 supplies cabinet identification data and a cabinet license from their cabinet hardware. For instance, the wagering game machines 909 supply the information during startup. As another example, the license compliance server 901 may query each of the wagering game machines 909 upon detecting their activation (e.g., connection to the network 907). Embodiments can obtain cabinet identification data without licenses from the wagering game machines over a network, and utilize a multi-cabinet electronic license at a server or other location remote from the wagering game machines.

At stage B, the license compliance server 901 authenticates a multi-cabinet license based on the cabinet license identification data and at least one of the cabinet licenses. For example, the license compliance server can generate a hash of all of the cabinet licenses and the cabinet identification data. The license compliance server can then validate the hash against the signed multi-cabinet license manifest payload 903. As another example, the license compliance server 901 can verify that all of the cabinet licenses are identical, and then generate authentication data with all of the cabinet identification data and just one of the cabinet licenses. The multi-cabinet license 905 can indicate terms in addition to the individual cabinet licenses (e.g., network terms or aggregate cabinet terms). In that case, the license compliance server can authenticate the individual terms, and separately authenticate the additional terms. Examples of additional terms include distance thresholds for the group of wagering game machines, network requirements (e.g., particular bandwidth, security protocol, etc.), etc.

At stage C, the license compliance server 901 enforces compliance with the multi-cabinet license. For instance, the license compliance server 901 can send shutdown codes to those of the wagering game machines 909 that violate the individual cabinet license. The license compliance server 901 can prevent those of the wagering game machines 909 that violate individual terms and/or multi-cabinet terms from being associated with a bonus game server. The license compliance server 901 can generate notifications that communicate the multi-cabinet terms that are violated to allow rectification of the violation.

Figure 10:
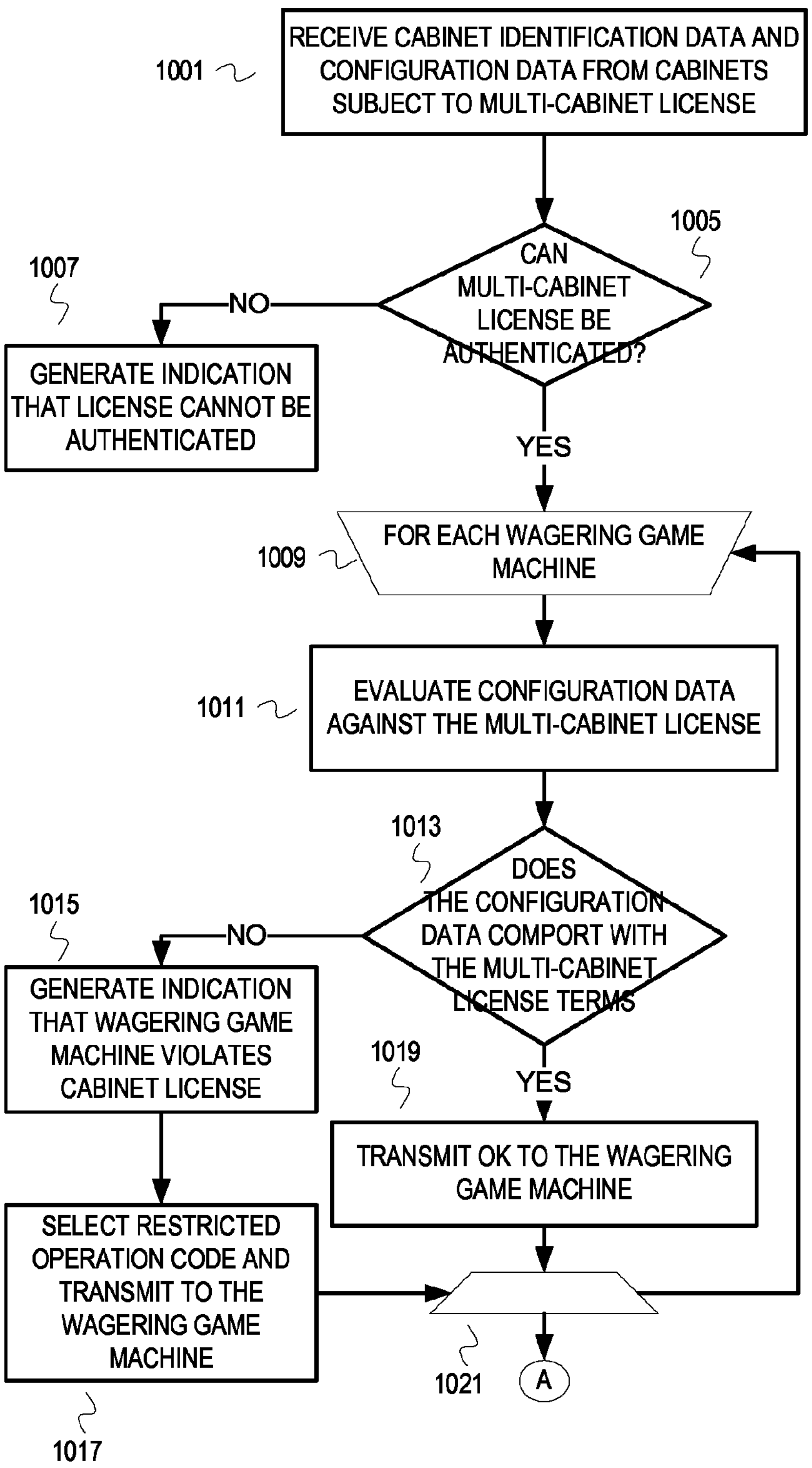
FIGS. 10-11 depict a flowchart of example operations for a enforcing a multi-cabinet license.
Figure 11:
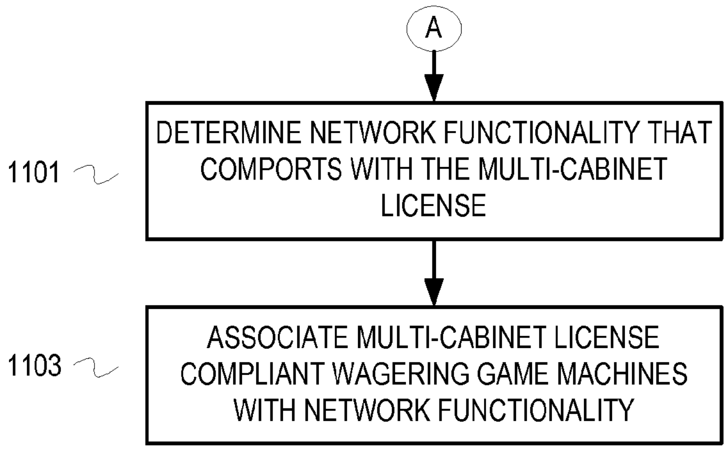

FIGS. 10-11 depict a flowchart of example operations for a enforcing a multi-cabinet license. At block 1001, cabinet identification data and corresponding configuration data are received from cabinets subject to a multi-cabinet license.

At block 1005, it is determined if the multi-cabinet license can be authenticated. If the multi-cabinet license cannot be authenticated then control flows to block 1007. If the multi-cabinet license can be authenticated, then control flows to block 1009.

At block 1007, an indication that the multi-cabinet license cannot be authenticated is generated. For example, an entry is added to a log that indicates failure of cabinet license authentication. As another example, a value can be set that leads to a notification being sent to an administrator to inform the administrator of the failed authentication. In addition, a license compliance server can determine which wagering game machine(s) caused the authentication to fail and indicate that wagering game machine(s).

At block 1009, a loop begins for each of the wagering game machines.

At block 1011, configuration data of a cabinet is evaluated against the multi-cabinet license. For instance, the terms of the multi-cabinet license are read and compared against the configuration data.

At block 1013, it is determined if the configuration data comports with the multi-cabinet license terms. If the configuration does not comport with the multi-cabinet license terms, then control flows to block 1015. If the configuration data comports with the terms of the authenticated multi-cabinet license, then control flows to block 1019.

At block 1015, an indication that the wagering game machine violates the authenticated multi-cabinet license is generated. The indication can indicate the cabinet identification data of the violating wagering game machine, as well as aspects of the configuration that violate the license.

At block 1017, a restricted operation code is selected and transmitted to the wagering game machine. For instance, the wagering game machine can be programmed to operate in accordance with a code from a license compliance server. Operating codes can be defined for multiple levels of operation.

If the configuration data comports with the multi-cabinet license terms, an OK code is transmitted to the wagering game machine.

At block 1021, the loop ends. Control either returns to block 1009 for the next wagering game machine in the group or flows to block 1101 of FIG. 11.

FIG. 11 depicts operations that continue from FIG. 10. At block 1101, network functionality that comports with the multi-cabinet license is determined. Examples of network functionality include participation in community games, participation in bonus games, access to social networking applications, connecting to performance measurement applications, etc.

At block 1103, the multi-cabinet license compliant wagering game machines are associated with the network functionality. For instance, identities of the wagering game machines are communicated to a server that manages a community game.

The flowcharts presented herein are examples and do not limit embodiments of the inventive subject matter. Embodiments can perform operations in different orders, can perform some operations in parallel, can perform different operations, can perform additional operations, can perform fewer operations, etc. For instance, referring to FIGS. 3-4, indications of license violations can be accumulated in memory until all compliance evaluation completes. After compliance evaluation operations complete, then an indication can be generated (e.g., a single log entry or single notification to indicate failure of terms that differentiates or that does not differentiate between violation of software terms and hardware terms). Referring to FIG. 8, operations can accommodate multiple license addendums. For example, operations can iterate through references to license addendums in the cabinet license. Also, detection of a license addendum may be postponed until after it is determined if license addendums are allowed.

In certain embodiments, the operations can be performed by executing instructions residing on machine-readable media (e.g., software), while in other embodiments, the operations can be performed by hardware and/or other logic (e.g., firmware).

Wagering Game Machine Architectures

Figure 12:
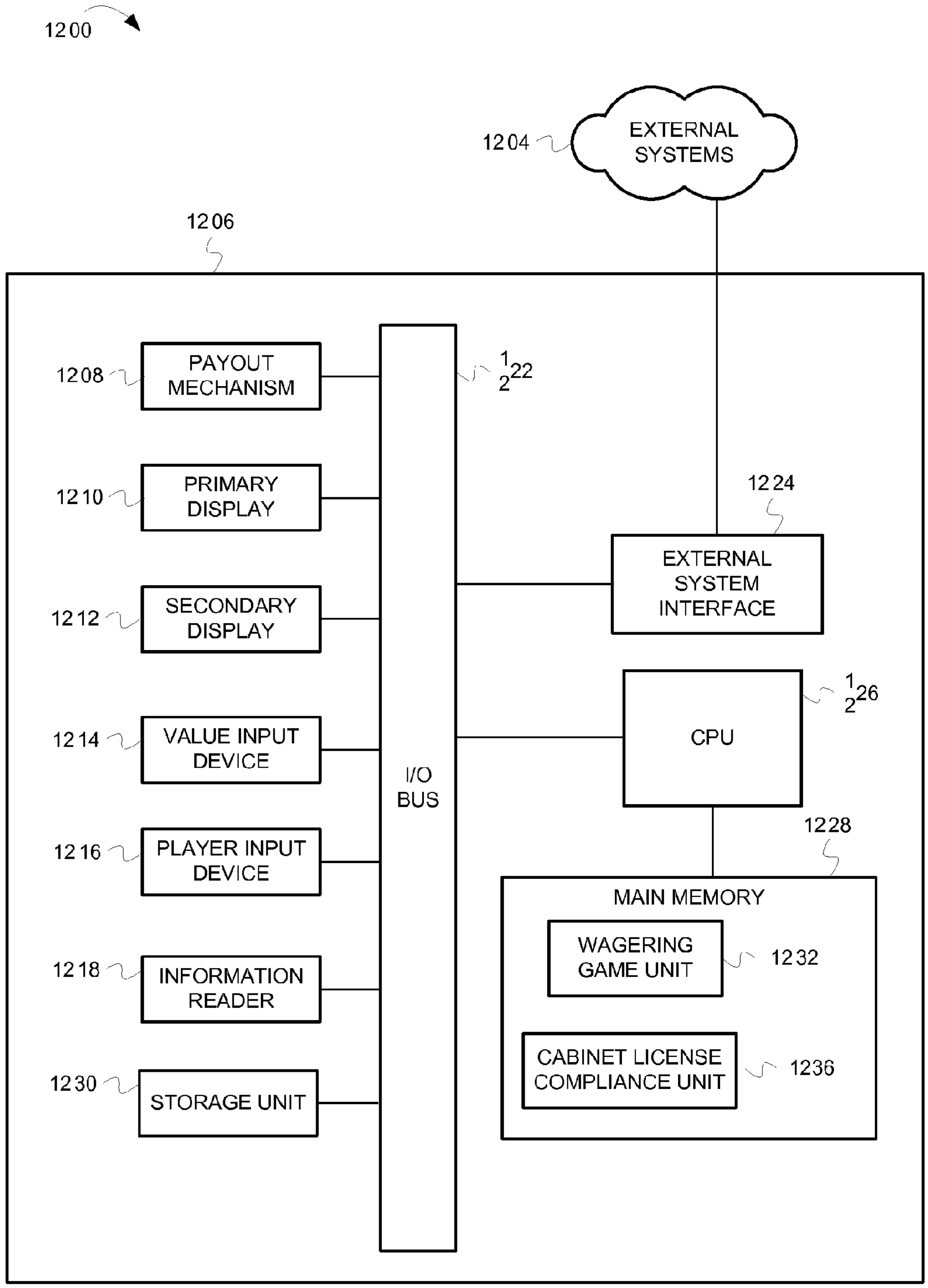
FIG. 12 is a block diagram illustrating a wagering game machine architecture, according to example embodiments of the invention.

FIG. 12 is a block diagram illustrating a wagering game machine architecture, according to example embodiments of the invention. As shown in FIG. 12, the wagering game machine architecture 1200 includes a wagering game machine 1206, which includes a central processing unit (CPU) 1226 connected to main memory 1228. The CPU 1226 can include any suitable processor, such as an Intel® Pentium® processor, Intel Core 2 Duo processor, AMD Opteron® processor, or UltraSPARC® processor. The main memory 1228 includes a wagering game unit 1232. In one embodiment, the wagering game unit 1232 can present wagering games, such as video poker, video black jack, video slots, video lottery, etc., in whole or part. The main memory 1228 also comprises a cabinet license compliance unit 1236. The cabinet license compliance unit 1236 authenticates a cabinet license manifest with a digitally signed cabinet manifest obtained from cabinet hardware. The cabinet license compliance unit 1236 then determines compliance with the authenticated cabinet license. The cabinet license compliance unit 1236 also performs operations to enforce the authenticated cabinet license. Embodiments can vary the responsibility of the cabinet license compliance unit 1236. The cabinet license compliance unit 1236 may not authenticate the license, but may receive indication of authentication or be invoked only after authentication. The cabinet license compliance unit 1236 can also be implemented to only perform one of compliance and enforcement operations.

The CPU 1226 is also connected to an input/output (I/O) bus 1222, which can include any suitable bus technologies, such as an AGTL+ frontside bus and a PCI backside bus. The I/O bus 1222 is connected to a payout mechanism 1208, primary display 1210, secondary display 1212, value input device 1214, player input device 1216, information reader 1218, and storage unit 1230. The player input device 1216 can include the value input device 1214 to the extent the player input device 1216 is used to place wagers. The I/O bus 1222 is also connected to an external system interface 1224, which is connected to external systems 1204 (e.g., wagering game networks).

In one embodiment, the wagering game machine 1206 can include additional peripheral devices and/or more than one of each component shown in FIG. 12. For example, in one embodiment, the wagering game machine 1206 can include multiple external system interfaces 1224 and/or multiple CPUs 1226. In one embodiment, any of the components can be integrated or subdivided.

Any component of the architecture 1200 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). Examples of machine-readable storage media include, but are not limited to, read only memory (ROM), random access memory (RAM), magnetic disk storage media, optical storage media, flash memory machines, etc. Examples of machine-readable signal propagation media include any copper wire, fiber optic cables, and other media suitable for propagating signals over a wired and/or wireless network.

While FIG. 12 describes an example wagering game machine architecture, this section continues with a discussion wagering game networks.

Wagering Game Networks

Figure 13:
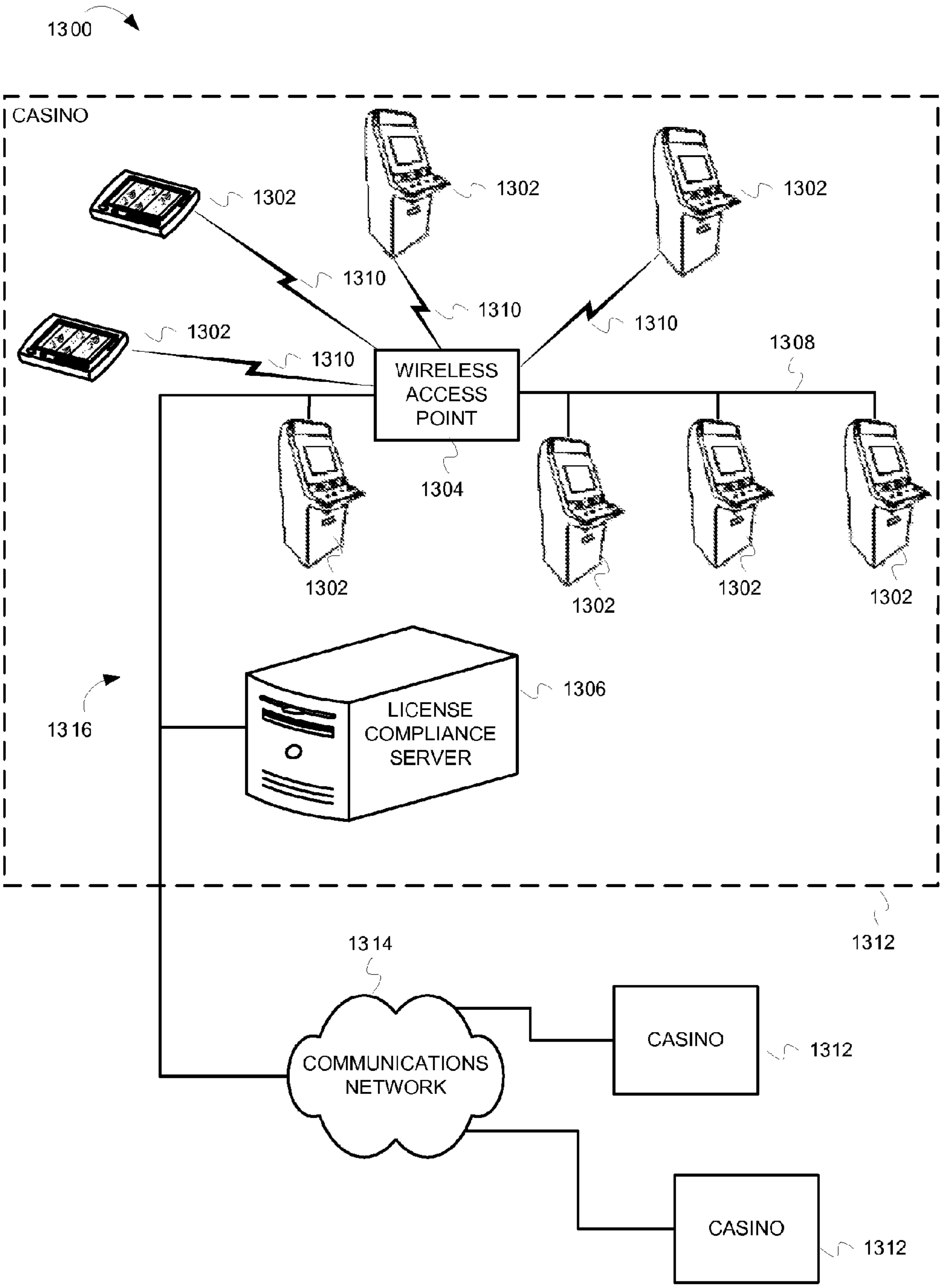
FIG. 13 is a block diagram illustrating a wagering game network 1300, according to example embodiments of the invention.

FIG. 13 is a block diagram illustrating a wagering game network 1300, according to example embodiments of the invention. As shown in FIG. 13, the wagering game network 1300 includes a plurality of casinos 1312 connected to a communications network 1314.

Each casino 1312 includes a local area network 1316, which includes an access point 1304, a license compliance server 1306, and wagering game machines 1302. The access point 13304 provides wireless communication links 1310 and wired communication links 1308. The wired and wireless communication links can employ any suitable connection technology, such as Bluetooth, 802.11, Ethernet, public switched telephone networks, SONET, etc. The license compliance server 1306 ensure compliance with a multi-cabinet license, and can allow or prohibit network functionality for those wagering game machines that do not comply with cabinet licenses. The license compliance server 1306 can monitory a casino or multiple casinos to ensure license compliance.

The wagering game machines 1302 described herein can take any suitable form, such as floor standing models, handheld mobile units, bartop models, workstation-type console models, etc. Further, the wagering game machines 1302 can be primarily dedicated for use in conducting wagering games, or can include non-dedicated devices, such as mobile phones, personal digital assistants, personal computers, etc. In one embodiment, the wagering game network 1300 can include other network devices, such as accounting servers, wide area progressive servers, player tracking servers, and/or other devices suitable for use in connection with embodiments of the invention.

In some embodiments, wagering game machines 1302 and wagering game servers (not depicted) work together such that a wagering game machine 1302 can be operated as a thin, thick, or intermediate client. For example, one or more elements of game play may be controlled by the wagering game machine 1302 (client) or the wagering game server (server). Game play elements can include executable game code, lookup tables, configuration files, game outcome, audio or visual representations of the game, game assets or the like. In a thin-client example, the wagering game server can perform functions such as determining game outcome or managing assets, while the wagering game machine 1302 can present a graphical representation of such outcome or asset modification to the user (e.g., player). In a thick-client example, the wagering game machines 1302 can determine game outcomes and communicate the outcomes to the wagering game server for recording or managing a player's account.

In some embodiments, either the wagering game machines 1302 (client) or the license compliance server 1306 can provide functionality that is not directly related to game play. For example, account transactions and account rules may be managed centrally (e.g., by the license compliance server 1306) or locally (e.g., by the wagering game machine 1302). Other functionality not directly related to game play may include power management, presentation of advertising, software or firmware updates, system quality or security checks, etc.

Any of the wagering game network components (e.g., the wagering game machines 1302) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

authenticating an electronic license secured in hardware affixed to a cabinet of a wagering game machine, wherein said authenticating the electronic license at least uses a cabinet identifier;

determining that a configuration of the wagering game machine does not comport with terms of the electronic license, wherein the license corresponds to the cabinet and the terms of the license indicate one or more configurations permissible for the wagering game machine; and regulating operation of the wagering game machine responsive to said determining that the configuration of the wagering game machine does not comport with the terms of the electronic license.

2. The method of claim 1 further comprising obtaining authentication data from the hardware affixed to the cabinet, wherein said authenticating the electronic license uses the authentication data.

3. The method of claim 2 further comprising obtaining the cabinet identifier from the hardware affixed to the cabinet, wherein the cabinet identifier is also used for said authenticating the electronic license.

4. The method of claim 2, wherein the authentication data was derived from at least the cabinet identifier and the electronic license.

5. The method of claim 4, wherein the authentication data is digitally signed.

6. The method of claim 2, wherein one of an operating system and a hardware interface of the wagering game machine performs said obtaining authentication data from the hardware affixed to the cabinet.

7. The method of claim 1, wherein the cabinet identifier identifies at least one of the cabinet, the hardware affixed to the cabinet, and a component of the hardware affixed to the cabinet.

8. The method of claim 1, wherein the hardware affixed to the cabinet comprises one of a cryptographic processor, secure memory, a backplane with secure memory, and a midplane with secure memory.

9. The method of claim 8, wherein the secure memory comprises one of write protected memory, copy protected memory, and encrypted memory.

10. The method of claim 1, wherein said determining whether the configuration of the wagering game machine comports with the terms of the electronic license comprises determining if at least one of a software configuration and a hardware configuration of the wagering game machine comports with the terms of the electronic license.

11. The method of claim 1, wherein said regulating operation of the wagering game machine comprises one of shutting down the wagering game machine, limiting operation of the wagering game machine, and allowing the wagering game machine to operate for a limited period of time.

12. The method of claim 1 further comprising generating a license violation notification if the configuration of the wagering game machine does not comport with the terms of the electronic license, and generating an indication that the wagering game machine complies with the electronic license if the configuration of the wagering game machine comports with the terms of the electronic license.

13. A method comprising:

authenticating an electronic license secured in hardware affixed to a cabinet of a wagering game machine, wherein said authenticating the electronic license at least uses a cabinet identifier;

evaluating a configuration of the wagering game machine against terms of the electronic license;

determining that the wagering game machine violates the electronic license based on said evaluating the configuration of the wagering game machine against the terms of the electronic license; and regulating operation of the wagering game machine in response to said determining that the wagering game machine violates the electronic license.

14. The method of claim 13, wherein said regulating operation of the wagering game machine comprises one of shutting down the wagering game machine, allowing the wagering game machine to operate for a limited period of time, allowing limited operation of the wagering game machine.

15. The method of claim 13, wherein said configuration comprises at least one of a software configuration and a hardware configuration.

16. The method of claim 13, wherein said determining that the wagering game machine violates the electronic license comprises one of determining that a prohibited hardware component is installed or active, determining that a prohibited application is installed, determining that an attempt is being made to install a prohibited application, determining that a required hardware component or required software is not installed, and determining that a hardware component is not properly certified.

17. The method of claim 13 further comprising generating an indication that the wagering game machine violates the electronic license.

18. The method of claim 17, wherein said generating the indication comprises one of generating a notification, updating a log, and setting a hardware flag.

19. One or more non-transitory machine-readable storage media encoded with instructions executable by a machine, the instructions configured to:

obtain cabinet identification data from a plurality of wagering game machines over a network, wherein the cabinet identification data identifies cabinets of the wagering game machines;

authenticate an electronic license that applies to the plurality of wagering game machines, wherein the instructions are configured to use the cabinet identification data to authenticate the electronic license;

evaluate configuration of each of the plurality of wagering game machines against terms of the electronic license, wherein the license corresponds to the cabinets and the terms of the license indicate one or more permissible configurations of the plurality of wagering game machines; and enforce the electronic license upon the plurality of wagering game machines based on a result of the instructions evaluating the configuration of each of the plurality of wagering game machines against the terms of the electronic license.

20. The machine-readable storage media of claim 19 further comprising the instructions being configured to obtain authentication data from the plurality of wagering games, wherein the instructions are configured to use the authentication data when authenticating the electronic license.

21. The machine-readable storage media of claim 19, wherein the instructions being configured to authenticate the electronic license comprises the instructions being configured to authenticate that the electronic license is unmodified and originates from a cabinetmaker associated with the cabinets of the wagering game machines.

22. The machine-readable storage media of claim 21, wherein the authentication data comprises a digitally signed hash of the electronic license and the cabinet identification data.

23. The machine-readable storage media of claim 19, wherein the cabinet identification data comprises at least one of a cabinet model number, a cabinet type, a cabinet serial number, a cabinet hardware serial number, and a digital registration number of a cabinet hardware component.

24. The machine-readable storage media of claim 19, wherein the instructions being configured enforce the electronic license comprises the instructions being configured to transmit respective operation codes to the plurality of wagering game machines, wherein each of the operation codes is based on evaluating result of the instructions evaluating configuration of each of the plurality of wagering game machines against terms of the electronic license.

25. A wagering game machine comprising:

a cabinet;

a processor coupled with the cabinet; and means for authenticating an electronic license, which is bound to the cabinet, with authentication data partially derived from a cabinet identifier that identifies the cabinet, wherein said means for authenticating the electronic license use the processor;

means for determining compliance of the wagering game machine with the authenticated electronic license; and means for regulating operation of the wagering game machine to enforce terms of the electronic license.

26. The wagering game machine of claim 25 further comprising:

means for authenticating an addendum to the electronic license, wherein the compliance means also determine compliance of the wagering game machine with the authenticated addendum, wherein the regulating means also regulate operation of the wagering game machine to enforce terms of the addendum.

* * * * *